United States Patent [19]

Horiike et al.

[11] 4,435,340

[45] Mar. 6, 1984

[54] PROCESS FOR PREPARING MICROCAPSULES FOR PRESSURE SENSITIVE MANIFOLD PAPER

[75] Inventors: Tetsuro Horiike; Takio Kuroda, both of Sakai; Tomoharu Shiozaki, Amagasaki, all of Japan

[73] Assignee: Kanzaki Paper Manufacturing Company Limited, Tokyo, Japan

[21] Appl. No.: 340,972

[22] Filed: Jan. 20, 1982

[30] Foreign Application Priority Data

Jan. 27, 1981 [JP] Japan .................................. 56-11374
Jun. 30, 1981 [JP] Japan ................................ 56-102518

[51] Int. Cl.$^3$ .............................................. B01J 13/02

[52] U.S. Cl. .................................... 264/4.7; 282/27.5; 428/320.6; 428/402.21; 428/914

[58] Field of Search .......................... 252/316; 264/4.7

[56] References Cited

U.S. PATENT DOCUMENTS 3,577,515 5/1971 Vandegaer ...................... 252/316 X
3,900,669 8/1975 Kiritani .......................... 252/316 X
4,228,216 10/1980 Austin et al. .................. 252/316 X

*Primary Examiner*—Richard D. Lovering
*Attorney, Agent, or Firm*—Buell, Blenko, Ziesenheim & Beck

[57] ABSTRACT

A process for preparing microcapsules for pressure sensitive manifold paper characterized by emulsifying in a hydrophilic liquid a hydrophobic liquid containing an aromatic isocyanate represented by the formula

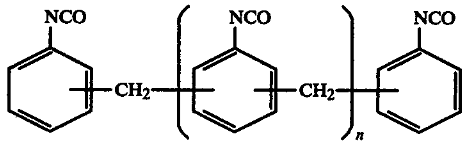

wherein n is an integer of 1 to 10, an aliphatic isocyanate and an electron donating organic chromogenic material, and forming a polymer at the interface to cover hydrophobic liquid droplets with the polymer.

5 Claims, No Drawings

PROCESS FOR PREPARING MICROCAPSULES FOR PRESSURE SENSITIVE MANIFOLD PAPER

This invention relates to a process for preparing microcapsules for pressure sensitive manifold paper, and more particularly to a process for preparing microcapsules by interfacial polymerization or in-situ polymerization with use of isocyanate compounds as wall forming materials for the microcapsules.

It is known to prepare microcapsules for pressure sensitive manifold papers by complex coacervation, simple coacervation, interfacial polymerization, in-situ polymerization, etc.

Gelatin-gum arabic systems, which are natural high polymers, are most widely used for forming microcapsule walls by coacervation. In recent years, however, attention has been directed to microcapsules prepared from synthetic high-molecular-weight materials by interfacial polymerization of in-situ polymerization. Such microcapsules are produced, for example, with use of isocyanate and water, isocyanate and polyamine, isocyanate and polyol, isothiocyanate and water, isothiocyanate and polyamine, isothiocyanate and polyol, epoxy compound, urea-formaldehyde resin or acid chloride and amine. Microcapsules produced from these materials have attracted attention for use in pressure sensitive manifold papers for the following reasons. These microcapsules can be formulated into a coating composition of higher concentration than those of natural polymeric material, with the result that the higher concentration permits a speedy coating operation which affords manifold paper with improved productivity. Since the wall forming the microcapsules has increased compactness, the enclosed oily droplets are less likely to spontaneously ooze from the capsules. The microcapsules are therefore suited for use in pressure sensitive manifold paper of the self-contained type which has incorporated therein microcapsules and a color developer in layers or conjointly. The microcapsules are easy and inexpensive to produce and have high resistance to water. Although having these advantages, the microcapsules of the type described nevertheless have drawbacks. Especially those prepared from isocyanate compounds are not fully resistant to solvents. When such microcapsules are stored in an atmosphere containing an organic solvent, oily droplets are extracted from some capsules and transfer to the color developer layer to inadvertently form a color. Further when inadvertently subjected to low pressure other than handwriting or typewriting pressure, capsules will readily rupture and produce a color smudge. The microcapsules of this type have another drawback in that when stored for a prolonged period of time, the capsule wall deteriorates to form a color unintentionally.

The main object of the present invention is to overcome the foregoing drawbacks of microcapsules prepared with use of isocyanate compounds.

More specifically an object of the invention is to eliminate the drawbacks without impairing the advantages of isocyanate compounds in any way.

Another object of the invention is to provide microcapsules which are prepared with use of isocyanate compounds and which have outstanding stability for storage for a prolonged period of time.

Another object of the invention is to provide microcapsules which are prepared with use of isocyanate compounds and which have high resistance to solvents.

Another object of the invention is to provide microcapsules which are prepared with use of isocyanate compounds and which are less likely to form a color when inadvertently subjected to low pressure.

Another object of the invention is to provide microcapsules which have outstanding properties to form a color under low pressure, i.e. which produce a color of high density even when subjected to low handwriting pressure.

These objects and other features of the present invention will become apparent from the following description.

The foregoing objects of the present invention can be fulfilled by using an aromatic isocyanate represented by the formula

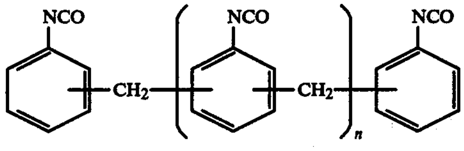

wherein n is an integer of 1 to 10 in combination with an aliphatic isocyanate, with or without further using a polyamine conjointly with the isocyanates.

Our research has revealed the following.

(1) In a process for preparing microcapsules by using aromatic isocyanate compounds of the formula

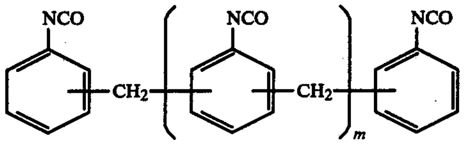

wherein m is 0 or an integer of 1 to 10 in combination with aliphatic isocyanate compounds, microcapsules can be obtained with exceedingly high long-term stability when an aromatic isocyanate compound of the above formula wherein m is 1 or larger is selected for use with an aliphatic isocyanate compound, owing to the synergistic effect of the two compounds.

(2) The selective combined use of the two compounds gives the resulting microcapsules enhanced resistance to solvents and reduced susceptibility to inadvertent color forming under low pressure.

(3) When a polyamine is further used conjointly with the two compounds including the selected compound, the resulting microcapsules have greatly improved color forming properties under low writing pressures, (4) The advantages of isocyanate compounds are in no way impaired by the selective combined use of the two compounds.

Examples of useful aromatic isocyanates of the formula

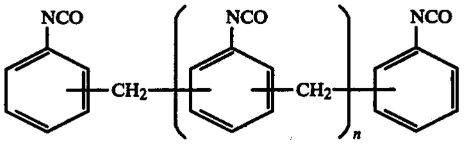

wherein n is an integer of 1 to 10 are triphenyldimethylene triisocyanate, tetraphenyltrimethylene tetraisocyanate, pentaphenyltetramethylene pentaisocyanate, etc. With respect to the compounds of the above formula, the smaller the number n, the better, since the isocyanate wherein n is smaller has higher solubility in the hydrophobic liquid to be used for the preparation of microcapsules. According to the invention, the aromatic isocyanates wherein n is not smaller than 1 are usable in combination with the isocyanate wherein n is 0. In this case, the isocyanates with n not smaller than 1 are used in an amount of at least 10%, prepferably at least 40%, based on all the aromatic isocyanates used. For a commercial operation, it is preferable to use the isocyanates of the former type in an amount of up to 70%.

The aliphatic isocyanate to be used in this invention is any of a wide variety of those heretofore used for the preparation of microcapsules of the type described. Examples of useful aliphatic isocyanates are trimethylene diisocyanate, hexamethylene diisocyanate, lysine diisocyanate, propylene-1,2-diisocyanate, butylene-1,2-diisocyanate, ethylidyne diisocyanate, 4-isocyanatemethyl-1,8-octamethylene diisocyanate, and addition products of these diisocyanates with polyhydroxy cmpounds, polyamine, polycarboxylic acids, polythiols or epoxy compounds. Similarly useful are trimers of aliphatic polyisocyanates including ethylene diisocyanate, decamethylene diisocyanate, lysine diisocyanate, trimethylhexamethylene diisocyanate and hexamethylene diisocyanate, such trimers being represented by the formula

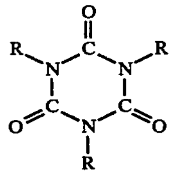

or

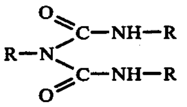

wherein R is an aliphatic compound having at least one isocyanate group.

The aromatic isocyanate and the aliphatic isocyanate are used in the ratio of 0.01 to 100 parts by weight, preferably 0.05 to 20 parts by weight, more preferably 0.1 to 10 parts by weight, of the latter per part by weight of the former.

The polyamine to be used in this invention is any of those which have at least two —NH or —$NH_2$ groups in the molecule and which are soluble or dispersible in hydrophilic liquids. Examples of useful polyamines are aliphatic polyamines such as diethylenetriamine, triethylenetetramine, 1,3-propylenediamine and hexamethylenediamine; adducts of aliphatic polyamines and epoxy compounds; alicyclic polyamines such as piperazine; heterocyclic diamines such as 3,9-bis-aminopropyl-2,4,8,10-tetraoxaspiro-[5,5]undecane; etc.

To prepare microcapsules for pressure sensitive manifold paper, a hydrophobic liquid containing capsule wall forming materials and an electron donating organic chromogenic material is emulsified in a hydrophilic liquid, followed by polymerization to form a polymer at the interface and cover hydrophobic liquid droplets with the polymer.

The hydrophobic liquid usable in any of those heretofore used in the art and including, for example, cotton seed oil, hydrogenated terphenyl, hydrogenated terphenyl derivatives, alkylbiphenyl, alkylnaphthalene, diallylalkane, kerosene, paraffin, dibasic acid esters such as phthalates, and like natural and synthetic oils. These liquids are used singly or in admixture.

The combined amount of the isocyanates to be added to the hydrophobic liquid is preferably 0.02 to 60 parts by weight, more preferably 0.03 to 40 parts by weight, per part by weight of the liquid.

It is critical that the hydrophobic liquid have dissolved therein an electron donating organic chromogenic material which undergoes a color forming reaction with a color developer. Examples of useful chromogenic materials are those heretofore used and including triarylmethane compounds such as 3,3-bis(p-dimethylaminophenyl)-6-dimethylaminophthalide (CVL), 3,3-bis(p-dimethylaminophenyl)phthalide, 3-(p-dimethylaminophenyl)-3-(1,2-dimethylindole-3-yl)phthalide, etc., diphenylmethane compounds such as 4,4'-bisdimethylaminobenzhydrylbenzylether, N-halophenyl-leucoauramine, N-2,4,5-trichlorophenyl-leucoauramine, etc., fluoran compounds such as 7-diethylamino-3-chlorofluoran, 7-diethylamino-3-chloro-2-methylfluoran, 2-phenylamino-3-methyl-6-(N-ethyl-N-p-toluylamino)fluoran, etc., thiazine compounds such as benzoyl-leucomethyleneblue, p-nitrobenzyl-leucomethyleneblue, etc., and spiro compounds such as 3-methyl-spiro-dinaphthopyran, 3-ethyl-spiro-dinaphthopyran, 3-propyl-spiro-dinaphthopyran, 3-propyl-spiro-dibenzopyran, etc.

The hydrophobic liquid having incorporated therein the desired essential components is then emulsified in a hydrophilic liquid. Hydrophilic liquids heretofore used are useful, such as aqueous solutions of polyvinyl alcohol, gelatin, gum arabic, carboxymethyl cellulose, casein and the like, or mixtures of such materials.

The polyamine, when used, is added to the hydrophilic liquid after the hydrophobic liquid has been emulsified or dispersed therein. The amount of the polyamine to be used is usually 0.1 to 200 parts by weight, preferably 1 to 100 parts by weight, per 100 parts by weight of the combined amount of the isocyanates, although suitably variable in accordance with the kinds and amounts of the isocyanates, etc.

The resulting emulsion is then subjected to polymerization reaction to form a polymer at the interface. The polymerization is carried out by the interfacial polymerization process or in-situ polymerization process which has been used for the preparation of microcapsules. Such process can be carried out under usual conditions.

The microcapsules prepared by the process of this invention are useful not only for pressure sensitive manifold papers of the self-contained type but also for those of the transfer type comprising a top sheet having a capsule layer on one side thereof, or a middle sheet having a capsule layer on one side thereof in combination with a color developer layer formed on another side.

The invention will be described in greater detail with reference to the following examples, to which the invention is in no way limited.

EXAMPLE 1

A 0.8 g quantity of crystal violet lactone (CVL) and 0.5 g of benzoyl-leucomethyleneblue which serve as chromogenic materials are dissolved in 50 g of isopropylnaphthalene. In this oily solution are dissolved 2 g of an aromatic polyisocyanate, namely polymethylenepolyphenyl isocyanate (trade mark "MILLIONATE MR500", product of Nihon Polyurethane Co., Ltd., Japan, n=0, 26%; n=1, 34% n=2, 9% n=3 or more, 28% in mixture) and 4 g of aliphatic polyisocyanate, namely trimer of hexamethylene diisocyanate having biuret group. The resulting oily solution is added to 65 g of water containing 0.5 g of polyvinyl alcohol and 0.3 g of Turkey red oil dispersed therein. The mixture is vigorously agitated to obtain a dispersion of particles 7μ in mean size.

Subsequently 0.6 g of a polyamine, namely triethylenetetramine, is added to the dispersion, the mixture is maintained at a temperature of 65° C. for 1 hour and reacted at 85° C. for 3 hours for polymerization, whereby a microcapsule dispersion is prepared.

EXAMPLE 2

A 0.8 g of crystal violet lactone and 0.5 g of benzoyl-leucomethyleneblue which serve chromogenic materials are dissolved in 50 g of diethyldiphenyl. In this oily solution are dissolved 4 g of an aromatic polyisocyanate, namely polymethylenepolyphenyl isocyanate (trade mark "MILLIONATE MR500", product of Nihon Polyurethane Co., Ltd., Japan, n=0, 26%; n=1, 34%; n=2, 9%; n=3 or more, 28% in mixture) and 2 g of aliphatic polyisocyanate, namely hexamethylene diisocyanate. The resulting oily solution is added to 65 g of water containing 1 g of polyvinyl alcohol and 1 g of carboxymethyl cellulose dissolved therein. The mixture is vigorously agitated to obtain a dispersion of particles 9μ in mean size.

Subsequently polyamines, namely 0.5 g of diethylenetriamine and 0.1 g of hexamethylenediamine are added to the dispersion, the mixture is stirred at room temperature for 15 minutes, the system is heated to a temperature of 80° C. and subjected to polymerization, whereby a microcapsule dispersion is prepared.

EXAMPLE 3

In 50 g of isopropylnaphthalene are dissolved 0.2 g of 2,4-dimethyl-7-dimethylaminofluoran, 0.8 g of crystal violet lactone and 0.3 g of N-butyl-3-[bis{4-(N-methylanilino)phenyl}methyl]carbazole which all serve as chromogenic materials. There is dissolved in this oily solution 3 g of an aromatic polyisocyanate, namely polymethylenepolyphenyl isocyanate (trade mark "MILLIONATE MR300", product of Nihon Polyurethane Co., Ltd., Japan, n=0, 50%; n=1, 16%; n=2, 7%; n=3 or more, 19% in mixture) and 3 g of aliphatic polyisocyanate, namely trimer of hexamethylene diisocyanate having an isocyanurate ring. The oily solution is added to 65 g of water containing 0.8 g of polyvinyl alcohol dissolved therein. The mixture is vigorously agitated to obtain a dispersion of particles 11μ in mean size. The dispersion is stirred at room temperature for 1 hour, to the mixture is 1.5 g of an addition product of bisphenol A, epichlorohydrin and alkylamine and the resulting admixture is heated to a temperature of 90° C. and subjected to polymerization, whereby a microcapsule dispersion is prepared.

EXAMPLE 4

A 0.8 g quantity of crystal violet lactone and 0.5 g of benzoyl-leucomethyleneblue which serve as chromogenic materials are dissolved in 30 g of diethyldiphenyl. In this oily solution are dissolved 5 g of an aromatic polyisocyanate, namely polymethylenepolyphenyl isocyanate (trade mark "MILLIONATE MR500", product of Nihon Polyurethane Co., Ltd., Japan, n=0, 26%; n=1, 34%; n=2, 9%; n=3 or more, 28% in mixture) and 3 g of aliphatic polyisocyanate, namely hexamethylene diisocyanate. The resulting oily solution is added to 50 g of water containing 1 g of polyvinyl alcohol and 1 g of carboxymethyl cellulose dissolved therein. The mixture is vigorously agitated to obtain a dispersion of particles 9μ in mean size.

Subsequently the dispersion is agitated for 30 minutes at room temperature, and the system is heated to a temperature of 60° C., stirred for 1 hour, further heated to a temperature of 80° C. and subjected to polymerization, whereby a microcapsule dispersion is prepared.

EXAMPLE 5

A 0.5 g quantity of 3-(p-dimethylaminophenyl)-3-(1,2-dimethylindole-3-yl)phthalide and 0.4 g of p-nitrobenzoyl-leucomethyleneblue which serve as chromogenic materials are dissolved in 30 g of isopropylnaphthalene. In this oily solution are dissolved 4 g of an aromatic polyisocyanate, namely polymethylenepolyphenyl isocyanate (trade mark "MILLIONATE MR300", product of Nihon Polyurethane Co., Ltd., Japan, n=0, 50%; n=1, 16%; n=2, 7%; n=3 or more, 19% in mixture) and 5 g of addition product of 3 mole of aliphatic polyisocyanate, namely lysine diisocyanate and 1 mole of trimethylolpropane. To the resulting solution is added 0.2 g of tindibutyldilaurate as a catalyst.

The resulting oily solution is added to 60 g of water containing 1.2 g of gum arabic and 1.8 g of polyvinyl alcohol dissolved therein. The mixture is vigorously agitated to obtain a dispersion of particles 8μ in mean size. Subsequently the dispersion is heated to a temperature of 70° C. and agitated for 2 hours for polymerization, whereby a microcapsule dispersion is prepared.

EXAMPLE 6

A 0.7 g quantity of crystal violet lactone and 0.2 g of 2,4-dimethyl-7-dimethylaminofluoran are dissolved in 30 g of dimethyldiphenylethane. In this oily solution are dissolved 5 g of an aromatic polyisocyanate, namely polymethylenepolyphenyl isocyanate (trade mark "MILLIONATE MR100", product of Nihon Polyurethane Co., Ltd., Japan, n=0, 45%; n=1, 26%; n=2, 9%; n=3 or more, 16% in mixture) and 3 g of aliphatic polyisocyanate, namely trimethyl hexamethylene diisocyanate. To this solution is added 0.1 g of lead tributyl acetate as a catalyst. The resulting oily solution is added to 50 g of water containing 1.5 g of carboxymethyl cellulose dissolved therein. The mixture is vigorously agitated to obtain a dispersion of particles 7μ in mean size. Subsequently, the dispersion is stirred at room temperature for 30 minutes, heated to 60° C., agitated for 1 hour for polymerization, and further heated to 90° C. to complete the reaction, whereby a microcapsule dispersion is prepared.

EXAMPLE 7

A 0.2 g quantity of 2,4-dimethyl-7-dimethyl amino fluoran, 0.8 g of crystal violet lactone and 0.3 g of N-butyl-3-[bis{4-(N-methylanilino)phenyl}methyl]carbazole are dissolved in 50 g of isopropylnaphthalene. In this oily solution are dissolved 6 g of an aromatic polyisocyanate, namely polymethylenepolyphenyl isocyanate (trade mark "MILLIONATE MR300", product of Nihon Polyurethane Co., Ltd., Japan, n=0, 50%; n=1, 16%; n=2, 7%; n=3 or more, 19% in mixture) and 0.6 g of aliphatic polyisocyanate, namely trimer of hexamethylene diisocyanate having an isocyanurate ring.

The resulting solution is added to 65 g of water containing 0.8 g of polyvinyl alcohol dissolved therein. The mixture is vigorously agitated to obtain a dispersion of particles 11μ in mean size. Subsequently the dispersion is agitated at room temperature for 30 minutes, heated to 60° C., further stirred for 1 hour for polymerization and further heated to 90° C. to complete the reaction, whereby a microcapsule dispersion is prepared.

EXAMPLE 8

A 0.2 g quantity of 2,4-dimethyl-7-dimethylamino fluoran, 0.8 g of crystal violet lactone and 0.3 g of N-butyl-3-[bis{4-(N-methylanilino)phenyl}methyl]carbazole are dissolved in 50 g of isopropylnaphthalene. In this oily solution are dissolved 0.6 g of an aromatic polyisocyanate, namely polymethylenepolyphenyl isocyanate (trade mark "MILLIONATE MR300", product of Nihon Polyurethane Co., Ltd., Japan, n=0, 50%; n=1, 16%; n=2, 7%; n=3 or more, 19% in mixture) and 6 g of aliphatic polyisocyanate, namely trimer of hexamethylene diisocyanate having a isocyanurate ring. The resulting solution is added to 65 g of water containing 0.8 g of polyvinyl alcohol dissolved therein. The mixture is vigorously agitated to obtain a dispersion of particles 11μ in mean size. Subsequently the dispersion is agitated at room temperature for 1 hour, heated to 60° C., further stirred for 1 hour for polymerization and further heated to 90° C. to complete the reaction, whereby a microcapsule dispersion is prepared.

COMPARISON EXAMPLE 1

A microcapsule dispersion is prepared in the same manner as in Example 4 with the exception of using singly 8 g of aromatic polyisocyanate, namely polymethylenepolyphenyl isocyanate (trade mark "MILLIONATE MR500") without conjoint use of aliphatic polyisocyanate, namely hexamethylene diisocyanate.

COMPARISON EXAMPLE 2

A microcapsule dispersion is prepared in the same manner as in Example 4 with the exception of using singly 8 g of aromatic polyisocyanate, namely diphenylmethane-4,4'-diisocyanate (trade mark "MILLIONATE MT", product of Nihon Polyurethane Co., Ltd., Japan, n=0, 100%) without employing aliphatic polyisocyanate, namely hexamethylene diisocyanate.

COMPARISON EXAMPLE 3

A microcapsule dispersion is prepared by repeating the procedures of Example 4 with the exception of using only 8 g of aliphatic polyisocyanate, i.e. hexamethylene diisocyanate without employing aromatic polyisocyanate, i.e. polymethylenepolyphenol isocyanate.

COMPARISON EXAMPLE 4

A microcapsule dispersion is prepared by repeating the procedures of Example 5 with the exception of using diphenylmethane-4,4'-diisocyanate (trade mark "MILLIONATE MT", n=0, 100%) in place of aromatic polyisocyanate, i.e., polymethylenepolyphenyl isocyanate (trade mark "MILLIONATE MR500").

Top sheets of pressure sensitive manifold paper and middle sheets thereof are produced by using the microcapsule dispersions prepared in Examples 1-8 and Comparison Examples 1-4, conjointly with a color developer coating composition prepared by a process described below. Transfer-type pressure sensitive manifold papers prepared by using these sheets are tested for properties according to the following method. The results are shown in Table 1.

<Preparation of a color developer coating composition>

A color developer coating composition is prepared by pulverizing in a ball mill 65 parts by weight of aluminum hydroxide, 20 parts by weight of zinc oxide, 15 parts by weight of a molten mixture of zinc 3,5-di(α-methylbenzyl)salicylate and α-methylstyrenestyrene-styrene copolymer (mixed at a ratio of 80:20), 5 parts by weight of polyvinyl alcohol aqueous solution (calculated as solids) and 300 parts by weight of water for 24 hours to prepare a dispersion and adding to the dispersion 20 parts by weight of carboxylated styrene-butadiene copolymer latex (calculated as solids).

<Preparation of top sheets of pressure sensitive manifold paper>

Each microcapsule dispersion prepared in the foregoing examples is applied to paper weighing 44 $g/m^2$ in an amount of 4 $g/m^2$ by dry weight and is dried to prepare a top sheet of pressure sensitive manifold paper.

<Preparation of middle sheets of pressure sensitive manifold paper>

To one side of paper weight 44 $g/m^2$ is applied the aforesaid color developer coating composition in an amount of 5 $g/m^2$ by dry weight. Each microcapsule dispersion is applied to the other side of the paper in an amount of 4 $g/m^2$ by dry weight, whereby a pressure sensitive manifold paper is prepared.

Methods of determining properties

1. Degree of color of microcapsule coating

The degree of color of the microcapsule coating on the top sheet is measured with a Macbeth densitometer (RD-100R type with a yellow filter). Table 1 shows the result.

2. Color forming properties under high pressure

Two middle sheets are placed over each other with the microcapsule coating and the color developer coating opposed face-to-face, and the assembly is subjected to a typewriting pressure for color forming under the following conditions.

Typewriter: HERMES 700 EL
Type: 2 mm square flat-faced type
Pressure: + (high)

Twenty-four hours after typewriting, the density of the color is measured by the above instrument with use of a red filter. Table 1 shows the result.

3. Color forming properties under low pressure

The same procedure as above is repeated except that the sheets are subjected to a low typewriting pressure (−). Table 1 shows the result.

4. Smudging by pressure

The same sheet assembly as used above is subjected to a pressure of 15 $kg/cm^2$, and the density of color formed on the color developer coating is measured by the instrument with use of a yellow filter. Table 1 shows the result.

5. Heat resistance I (property indicative of long-term stability)

The middle sheet is allowed to stand in an atmospheric having a temperature of 120° C. for 6 hours, and the degree of color of the color developer is measured by the instrument with use of a yellow filter. Table 1 shows the result.

6. Heat resistance II (property indicative of long-term stability)

The same assembly of middle sheets as used above is allowed to stand in an atmosphere having a temperature of 120° C. for 6 hours, and the degree of color of the color developer coating is measured by the instrument with use of a yellow filter. Table 1 shows the result.

7. Resistance to solvent

The middle sheet is allowed to stand for 15 hours in an atmosphere saturated with trichloroethylene vapor, and the degree of color of the color developer coating is measured by the instrument with use of a red filter. Table 1 shows the result.

TABLE 1

| | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 | Comp. Ex. 4 |
|---|---|---|---|---|---|---|---|---|---|---|---|---|
| Degree of color of microcapsule coating | 0.07 | 0.07 | 0.07 | 0.08 | 0.07 | 0.08 | 0.12 | 0.07 | 0.16 | 0.15 | 0.08 | 0.08 |
| Color forming properties under high pressure | 0.65 | 0.67 | 0.68 | 0.58 | 0.56 | 0.58 | 0.60 | 0.58 | 0.59 | 0.60 | 0.51 | 0.56 |
| Color forming properties under low pressure | 0.40 | 0.45 | 0.45 | 0.30 | 0.29 | 0.29 | 0.31 | 0.30 | 0.31 | 0.32 | 0.25 | 0.29 |
| Smudging by pressure | 0.08 | 0.08 | 0.09 | 0.08 | 0.07 | 0.08 | 0.10 | 0.07 | 0.14 | 0.15 | 0.08 | 0.10 |
| Heat resistance I | 0.07 | 0.07 | 0.06 | 0.08 | 0.08 | 0.08 | 0.10 | 0.13 | 0.30 | 0.60 | 0.55 | 0.55 |
| Heat resistance II | 0.09 | 0.09 | 0.09 | 0.09 | 0.09 | 0.10 | 0.10 | 0.14 | 0.25 | 0.65 | 0.64 | 0.65 |
| Resistance to solvent | 0.25 | 0.26 | 0.20 | 0.35 | 0.28 | 0.35 | 0.36 | 0.28 | 0.55 | 0.70 | 0.50 | 0.55 |

EXAMPLE 9

A self-contained type pressure sensitive paper is prepared by the following process using the microcapsule dispersion of Example 2.

To the microcapsule dispersion of Example 2 is added a pulp powder in an amount of 30 parts by weight per 100 parts by weight of a hydrophobic liquid to adjust the concentration of the dispersion. The resultant capsule-containing coating composition is applied to paper weighing 40 g/m$^2$ in an amount of 6 g/m$^2$ by dry weight. A color developer coating composition disclosed below is applied to the coated side of the paper in an amount of 8 g/m$^2$ by dry weight, whereby a self-contained type pressure sensitive paper is obtained.

EXAMPLE 10

To the microcapsule dispersion of Example 3 are added 20 parts by weight of a pulp powder and 10 parts by weight of a σraw starch powder, per 100 parts by weight of a hydrophobic liquid to adjust the concentration of the dispersion. The resultant capsule-containing coating composition is applied to paper weighing 40 g/m$^2$ in an amount of 6 g/m$^2$ by dry weight. The color developer coating composition below is applied to the coated side of the paper in an amount of 8 g/m$^2$ by dry weight, whereby a self-contained type pressure sensitive paper is obtained.

EXAMPLE 11

A 0.8 g quantity of crystal violet lactone and 0.1 g of 3,6-bis(diethylamino)fluoran-γ-anilino lactam which serve as chromogenic materials are dissolved in 50 g of dimethyldiphenylethane. In this oily solution are dissolved in 4 g of an aromatic polyisocyanate, namely polymethylenepolyphenyl isocyanate (trade mark "MILLIONATE MR100", product of Nihon Polyurethane Co., Ltd., Japan, n=0, 45%; n=1, 26%; n=2, 9%; n=3 or more, 16% in mixture) and 4 g of an aliphatic polyisocyanate, namely addition product of 3 mole of lysine diisocyanate and 1 mole of trimethylolpropane. To the mixture is added 0.2 g of tindibutyldilaurate as a catalyst.

The oily mixture is added to 80 g of water containing 1 g of gum arabic and 1 g of polyvinyl alcohol dissolved therein. The resulting mixture is vigorously stirred to prepare a dispersion of particles 15μ in mean size. The dispersion is heated to a temperature of 70° C. and stirred for 1 hour, to the dispersion is added 0.2 g of addition product of poly (1-5) alkylene ($C_{2-6}$) polyamine and alkylene ($C_{2-18}$) oxide, and the mixture is stirred at 85° C. for 3 hours for polymerization, whereby a microcapsule dispersion is prepared.

To the microcapsule dispersion is added the color developer coating composition stated below in an amount of 200 parts by weight (calculated as solids) per 100 parts by weight of a hydrophobic liquid. The mixture is vigorously stirred and applied to paper weighing 40 g/m$^2$ in an amount of 9 g/m$^2$ by dry weight to prepare a self-contained type pressure sensitive paper.

EXAMPLE 12

A microcapsule dispersion is prepared in the same manner as in Example 2 with the exception of using none of the polyamines, namely diethylenetriamine (0.5 g) and hexamethylenediamine (0.1 g) used in Example 2.

A self-contained type pressure sensitive paper is prepared in the same manner as in Example 9 by using the microcapsule dispersion thus obtained.

EXAMPLE 13

A microcapsule dispersion is prepared in the same manner as in Example 3 with the exception of not using 1.5 g of polyamine addition product of bisphenol A, epichlorohydrin and alkylamine.

A self-contained type pressure sensitive paper is produced in the same manner as in Example 10 by using the microcapsule dispersion thus obtained.

COMPARISON EXAMPLE 5

To the microcapsule dispersion of Comparison Example 1 is added a pulp powder in an amount of 30 parts by weight per 100 parts by weight of a hydrophobic liquid to adjust the concentration of the dispersion. The resultant capsule-containing coating composition is applied to paper weighing 40 g/m$^2$ in an amount of 6 g/m$^2$ by dry weight. To the coated paper is applied the color developer coating composition described below in an amount of 8 g/m$^2$ by dry weight to prepare a self-contained type pressure sensitive paper. Blueing is found to have occurred upon application of the color developer coating composition, thereby deterioating the commercial value of the paper.

COMPARISON EXAMPLE 6

To the microcapsule dispersion of Comparison Example 3 are added 20 parts by weight of a pulp powder and 100 parts by weight of 20% aqueous solution of starch per 100 parts of a hydrophobic liquid to adjust the concentration of dispersion. The resultant capsule-containing coating composition is applied to paper weighing 40 g/$m^2$ in an amount of 6 g/$m^2$ by dry weight and dried. To the coated paper is applied the color developer coating composition in an amount of 8 g/$m^2$ by dry weight to prepare a self-contained type pressure sensitive paper. The pressure sensitive paper thus obtained is found to have reduced commercial value due to the blueing cased upon application of the color developer coating composition.

The color developer coating composition used in Examples 9-13 and Comparison Examples 5 and 6 are prepared by the following process.

<Preparation of a color developer coating composition>

In 400 parts by weight of water are fully dispersed 100 parts by weight of acid clay and 4 parts by weight of sodium hydroxide. To the dispersion is added 30 parts by weight of carboxylated styrene-butadiene copolymer latex (50% solids). A 10-part portion of 30% aqueous solution of sodium dialkylsulfosuccinate serving as a wetting agent is added to the mixture to prepare a color developer coating composition.

The self-contained type pressure sensitive papers above prepared are tested for the following properties by a method described below. Table 2 shows the results.

Low pressure and high pressure chromatographic properties

Low pressure chromogenic properties

A sheet of OCR paper weighing 105 g/$m^2$ is superposed on a sheet of the self-contained type pressure sensitive paper. The typing is performed by using a typewriter (Hermes-700EL) under the following conditions to check the self-contained type pressure sensitive paper for the properties described below.

Type: types 2 mm square (flat-faced type)

Typing pressure: − (low)

The color density is measured by a Macbeth densitometer (Red Filter) 24 hours after typewriting. (The greater the value is, the more excellent the color density is.)

High pressure chromogenic properties

The typewriting is carried out by use of the same typewriter as in the measurement of the low pressure chromogenic properties under the following conditions and with no OCR paper superposed on self-contained type pressure sensitive paper.

Type: types 2 mm square (flat-faced type)

Typing pressure: + (high)

The color density is measured by a Macbeth densitometer (Red Filter) 24 hours after typewriting.

Heat Resistance

Same as the above Heat Resistance I

Solvent Resistance

Same as above

TABLE 2

| | Ex. 9 | Ex. 10 | Ex. 11 | Ex. 12 | Ex. 13 | Comp. Ex. 5 | Comp. Ex. 6 |
|---|---|---|---|---|---|---|---|
| Low pressure chromogenic properties | 0.23 | 0.31 | 0.40 | 0.18 | 0.20 | 0.12 | 0.10 |
| High pressure chromogenic properties | 0.47 | 0.50 | 0.46 | 0.46 | 0.52 | 0.28 | 0.25 |
| Heat resistance | 0.09 | 0.07 | 0.07 | 0.22 | 0.18 | 0.80 | 0.90 |
| Solvent resistance | 0.30 | 0.25 | 0.23 | 0.75 | 0.72 | 0.85 | 0.82 |

What is claimed is:

1. A process for preparing microcapsules for pressure sensitive manifold paper characterized by emulsifying in a hydrophilic liquid a hydrophobic liquid containing an aromatic isocyanate repesented by the formula

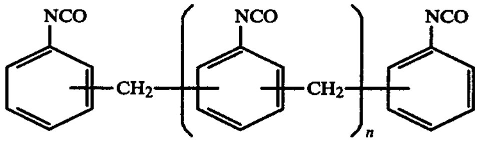

(I)

wherein n is an integer of 1 to 10, an aliphatic isocyanate and an electron donated organic chromogenic material, and forming a polymer at the interface to cover hydrophobic liquid droplets with the polymer, the aromatic isocyanate and the aliphatic isocyanate being used in the ratio of 1:0.05-20 by weight.

2. A process as defined in claim 1 wherein the ratio is 1:0.1-10 by weight.

3. A process as defined in claim 1 wherein n is 1 to 5.

4. A process as defined in claim 1 wherein a polyamine is added to the hydrophilic liquid after the hydrophobic liquid has been emulsified therein, the polyamine being used in an amount of 0.1 to 200 parts by weight per 100 parts by weight of the aromatic isocyanate and the aliphatic isocyanate combined.

5. A process as defined in claim 4 wherein the polyamine is at least one amine selected from the group consisting of aliphatic polyamines, adducts of aliphatic polyamines and epoxy compounds, alicyclic polyamines and heterocyclic diamines.

* * * * *

UNITED STATES PATENT AND TRADEMARK OFFICE

CERTIFICATE OF CORRECTION

PATENT NO. : 4,435,340

DATED : March 6, 1984

INVENTOR(S) : TETSURO HORIIKE, TAKIO KURODA and TOMOHARU SHIOZAKI

It is certified that error appears in the above-identified patent and that said Letters Patent is hereby corrected as shown below:

Column 1, line 20, "of" should be --or--.

Column 3, line 24, "cmpounds" should be --compounds--.

Column 3, line 64, "in" should be --is--.

Column 9, lines 1-2, "atmospheric" should be --atmosphere--.

Column 11, line 19, "cased" should be --caused--.

Column 11, line 51, "chromatographic" should be --chromogenic--.

Signed and Sealed this

*Fifth* Day of *June 1984*

[SEAL]

*Attest:*

GERALD J. MOSSINGHOFF

*Attesting Officer* *Commissioner of Patents and Trademarks*